US012791429B2

(12) United States Patent
Rotscholl et al.

(10) Patent No.: US 12,791,429 B2
(45) Date of Patent: Nov. 10, 2026

(54) OBJECTIVE LENS ARRANGEMENT, MEASURING DEVICE AND METHOD FOR MEASURING OF A NEAR EYE DISPLAY

(71) Applicant: TECHNOTEAM HOLDING GMBH, Iimenau (DE)

(72) Inventors: Ingo Rotscholl, Erfurt (DE); Tobias Porsch, Erfurt (DE); Stefan Schramm, Lengfeld (DE); Udo Krüger, Werra-Suhl-Tal (DE)

(73) Assignee: TECHNOTEAM HOLDING GMBH, Ilmenau (DE)

( * ) Notice: Subject to any disclaimer, the term of this patent is extended or adjusted under 35 U.S.C. 154(b) by 231 days.

(21) Appl. No.: 18/665,457

(22) Filed: May 15, 2024

(65) Prior Publication Data

US 2024/0385077 A1 Nov. 21, 2024

(30) Foreign Application Priority Data

May 19, 2023 (DE) ..................... 10 2023 113 210.5

(51) Int. Cl.
*G01M 11/00* (2006.01)
*G01M 11/02* (2006.01)
(Continued)

(52) U.S. Cl.
CPC ........ *G01M 11/30* (2013.01); *G01M 11/0285* (2013.01); *G02B 27/0172* (2013.01);
(Continued)

(58) Field of Classification Search
CPC .. G01M 11/30; G01M 11/0285; G01M 11/02; G01M 11/00; G02B 27/0172;
(Continued)

(56) References Cited

U.S. PATENT DOCUMENTS

2006/0119750 A1 * 6/2006 Epple ........................ G02B 3/12 349/5
2010/0259833 A1 * 10/2010 Jannard .................. G02B 15/00 359/666

(Continued)

FOREIGN PATENT DOCUMENTS

WO WO-2022204029 A1 * 9/2022 ............. G02B 23/08

OTHER PUBLICATIONS

German Office Action, dated Jan. 26, 2024 for corresponding German Application No. 10 2023 113 210.5 with English translation (12 pages).

(Continued)

*Primary Examiner* — Mohammed A Hasan
(74) *Attorney, Agent, or Firm* — INTELLECTUAL PROPERTY LAW GROUP LLP

(57) ABSTRACT

The invention relates to an objective lens arrangement (101) comprising a front aperture (140), an objective (120) and a liquid lens (110), wherein the objective (120) and the liquid lens (110) are fixedly arranged along an optical axis (OA, OA') at positions located on an image side (BS) relative to the front aperture (140) and are set up for imaging an imaging beam path presented on an opposite object side (OS) in front of the front aperture (140) in at least one sensor plane (S, S'). The optical effect of the liquid lens (110) can be adjusted in such a way that NED imaging beam paths which can be sharply perceived by a human observer can be sharply imaged in the at least one sensor plane (S, S') by adjusting the liquid lens (110). The front aperture (140) is designed as an aperture diaphragm for a system entrance pupil (EP) of the objective lens arrangement (101) and has an aperture opening of between one millimetre and six millimetres. The invention also relates to a measuring device (100) for measuring a near eye device (NED) (20) compris- (Continued)

ing such an objective lens arrangement (101) and a method for photometric measurement of a NED (20).

13 Claims, 12 Drawing Sheets

(51) Int. Cl.
*G02B 27/01* (2006.01)
*G02B 3/14* (2006.01)

(52) U.S. Cl.
CPC .......... *G02B 3/14* (2013.01); *G02B 2027/011* (2013.01); *G02B 2027/0132* (2013.01)

(58) Field of Classification Search
CPC ................ G02B 3/14; G02B 2027/011; G02B 2027/0132; G02B 13/0065; G02B 13/0075; G02B 9/64; G02B 13/0015; G02B 13/0055; G02B 13/009; G02B 2027/0178; G02B 15/142; G02B 27/286; G01J 3/0208; G01J 3/0237; G01J 3/506; G01J 1/0295; G01J 1/0407; G03B 9/02
USPC .......................................................... 359/642
See application file for complete search history.

(56) References Cited

U.S. PATENT DOCUMENTS

| | | | | |
|---|---|---|---|---|
| 2014/0221753 | A1* | 8/2014 | Teamney ............. | A61B 1/0019 600/167 |
| 2014/0285883 | A1* | 9/2014 | Jannard .................. | G02B 15/00 359/432 |
| 2019/0191151 | A1 | 6/2019 | Austin et al. | |
| 2022/0066140 | A1* | 3/2022 | Noethen ............ | G02B 13/0035 |

OTHER PUBLICATIONS

Extended European Search Report, dated Oct. 23, 2024 for corresponding European Application No. 24174719.5 with English translation (16 pages).

* cited by examiner

OBJECTIVE LENS ARRANGEMENT, MEASURING DEVICE AND METHOD FOR MEASURING OF A NEAR EYE DISPLAY

CROSS-REFERENCE TO RELATED APPLICATION

This application claims priority to German application no. DE 10 2023 113 210.5 filed on May 19, 2023, which is hereby incorporated by reference in its entirety.

BACKGROUND

1. Field of Invention

The invention relates to an objective lens arrangement with a front aperture, an objective and a liquid lens, wherein the objective and the liquid lens are fixedly arranged along an optical axis at positions lying on one image side in relation to the front aperture and are set up for imaging a virtual image presented on an opposite object side at an image distance in front of the front aperture in at least one sensor plane. The invention further relates to a measuring device for measuring a near eye display (NED) comprising such a lens arrangement and a sensor. The invention further relates to a method for the photometric measurement of a NED using such a measuring device.

2. Background Art

Near eye displays (NEDs) (also known as near eye devices) are known from the prior art as devices with which an image is presented at a distance that is significantly shorter than the reading distance, typically shorter than 5 centimetres. NEDs are known in the form of glasses (e.g. virtual reality (VR) glasses, augmented reality (AR) glasses), which can be fixed to the head of a viewer with eyeglass temples, frames and/or headbands. They have a, for example a light emitting diode (LED) display. An image displayed on this display element is presented to the observer's eye as a virtual image by means of an internal NED optic, which is located at a virtual distance from the pupil plane of the eye along the viewing axis (on the side of the NED pointing away from the observer).

The internal NED optics can be focused such that virtual images can be displayed at different distances. Different focusing states of the NED are compensated by correspondingly different accommodation states of the viewer's eye, so that the displayed image always appears sharp.

Typically, virtual images are displayed at a distance of at least 20 centimetres from the viewer's eye (corresponding to the reading distance or close-up range of the human eye). Here and in the following, a virtual image is understood to be a virtual image presented at such a distance (as seen from the viewer's eye, behind the NED) in the sense of geometrical ray optics.

Furthermore, NEDs are also known in which images are projected onto the retina of the observer's eye by sufficiently rapid deflection of a collimated laser beam or a similarly collimated beam path from another light source (for example by means of a micromechanical system with deflectable micromirrors). Such imaging methods, known as retinal writing or retinal imaging, can also be used to present images that appear from the observer's eye at a distance that can optionally be varied, for example by means of adaptive optics. Such NEDs may also require accommodation of the observer's eye to a fixed or even variable focal distance so that the presented image is correctly projected onto the retina.

Here and in the following, beam paths with which a NED projects images onto the retina of an observer's eye are generally referred to as NED imaging beam paths, regardless of whether a virtual image is projected onto the retina or whether a projection is made using rapidly deflected collimated beams (as in the case of retinal writing). In both cases, an exact photometric measurement requires an adjustment of the optics of the measuring device analogue to the accommodation of the observer's eye.

The document US 2019/0191151 A1 describes a system and method for performance characterization of multi configuration near eye displays that includes: a mirror; a lamp; a beamsplitter; a collimating and reflective lens for collimating light reflected from the beamsplitter and reflecting it back towards an image sensor having a view finder; a field-of-view (FOV) aperture to project light from the lamp onto the device under test (DUT) through the objective lens; a video viewfinder digital camera for capturing an virtual image of the DUT; a spectroradiometers for performing spectroradiometric measurements on a captured image of the defined measurement area to characterize the performance of the DUT; and a controller circuit for characterizing performance of the DUT based on the spectroradiometric measurements.

A photometric measurement of such NEDs also requires measuring devices that are sufficiently small and maneuverable to be inserted into a construction and movement space restricted by spectacle temples, frames and similar holding devices. In addition, it must be possible to simulate the accommodation behavior (change in the refractive power of the eye lens) and the adaptation behavior (change in the aperture diameter of the eye pupil, which acts as the entrance pupil of the eye) of an observer's eye with such measuring devices. Furthermore, for a correct measurement, the position of the entrance pupil of the measuring device must correspond to the position of the entrance pupil of the eye (i.e. the pupil of the eye).

Known photometric measuring devices do not fulfil these requirements, or only insufficiently. There is therefore a need for an improved measuring device and an improved measuring method for measuring NEDs.

SUMMARY

According to a first aspect, the invention is based on the problem of specifying a lens arrangement which is suitable for use in a measuring device for improved photometric measurement of NEDs.

According to a second aspect, the invention is also based on the problem of providing a measuring device that is suitable for improved photometric measurement of NEDs.

According to a third aspect, the invention is also based on the problem of providing a method for improved photometric measurement of NEDs.

According to the invention these problems are solved by the appended claims.

Advantageous embodiments of the invention are the subject of the subclaims.

A measuring device for photometric measurement, for example photometric and/or colourimetric and/or spectral measurement of a near eye display (NED) comprises a lens arrangement for imaging an imaging beam path presented by the NED, for example an imaging beam path for imaging a virtual image or an imaging beam path set up for retinal writing, onto a sensor surface of a sensor.

According to a first aspect of the invention, an objective lens arrangement comprises a front aperture, an objective (that may comprise one or more objective lenses) and a liquid lens whose optical effect, in particular its refractive power, can be varied. The objective and the liquid lens are arranged at fixed positions along an optical axis, i.e. immovable along the optical axis, and lie on an image side relative to the front aperture, i.e. on the side of the front aperture that faces away from the NED to be measured by the objective lens arrangement and that faces towards at least one sensor plane. The liquid lens can be designed as part of the objective, in particular structurally connected to it, or can be provided independently of the objective.

The objective and the liquid lens are set up and arranged to image the imaging rays emitted from the NED onto the at least one sensor plane, with the imaging rays being presented on the side of the front aperture opposite the image side. This side (facing towards the NED) will be referred to as the object side. The front aperture is thus arranged in front of the objective and the liquid lens such that it faces towards the NED to be measured (which provides the imaging beam path).

The optical effect of the liquid lens, in particular its focal length, can be adjusted. In particular, the liquid lens is set up with a change in refractive power analogous to the accommodation capacity of the human eye of approximately 10 diopters in such a way that an imaging beam path, which is presented by a NED for different accommodation states of an observer's eye, can be sharply imaged in the at least one sensor plane by adjusting the liquid lens.

The front aperture is designed as an aperture diaphragm for a system entrance aperture of the objective lens arrangement and has an aperture opening that falls within the range in which the aperture opening (the diameter) of an eye pupil opening of a human eye can be changed by adaptation. Preferably, the front aperture has an aperture opening with a diameter of between two millimetres and six millimetres.

The system entry aperture is the common cross-section of all homocentric beam bundles entering the lens arrangement.

The advantage of the objective lens arrangement is that the entrance pupil formed by the front aperture is accessible from the outside. This means that it can be positioned very precisely, for example in relation to a NED. Furthermore, it can be manipulated particularly easily, for example replaced with a front aperture with a different aperture or, if it is designed as an adjustable diaphragm, the aperture can be changed easily.

Furthermore, the objective lens arrangement has the advantage that the adjustable, preferably focusable liquid lens for different accommodation states of an observer's eye is used to sharply image the image beam paths presented by a NED onto the at least one sensor plane without requiring mechanical movement of the lens arrangement or of a component contained therein. This saves space compared to known solutions for focusable lens arrangements that require a movement range for lenses or lens groups. In particular, this enables a particularly short length of the lens arrangement in the direction of an optical axis passing vertically through the front aperture.

Such a lens arrangement can therefore be used particularly advantageously for measurement situations with limited freedom of movement, for example for imaging virtual images of a NED onto a sensor used for photometric measurement.

With NEDs that project directly (i.e. in the manner of retinal writing, for example by means of a laser beam), an internal NED optic usually ensures that the beams of the imaging beam path projected onto the observer's eye are main beams that pass through the principal point of the observer's eye. This ensures that a sharp image of the same size is always produced on the retina of the observer's eye, even when the eye is accommodated. It is known that the position of the principal point in an observer's eye can shift with accommodation.

In one embodiment of an objective lens arrangement that is set up for the measurement of such directly projecting NEDs, the liquid lens is arranged and set up in such a way that the principal point can be located by changing its refractive power. This makes it possible to investigate other potential effects triggered by accommodation.

In one embodiment of the lens arrangement, the objective and the liquid lens are set up for imaging a virtual image presented on an opposite object side at an image distance in front of the front aperture in at least one sensor plane, the optical effect of the liquid lens being adjustable in such a way that virtual images presented in a focusing range can be imaged sharply onto the at least one sensor plane by adjusting the liquid lens.

In particular, the refractive power of the liquid lens can be adjusted in such a way that virtual images, which are presented in a focusing range that can be sharply imaged on the retina of an observer's eye (in place of the measuring device) capturing the NED by accommodation, can be sharply imaged in the at least one sensor plane. In other words, the liquid lens is set up in conjunction with the objective for imaging virtual images onto the at least one sensor plane whose image distance falls within the focal range.

In one embodiment, the front aperture is designed as an interchangeable diaphragm with a discretely adjustable diaphragm opening or as an iris diaphragm with a continuously adjustable diaphragm opening. This embodiment is suitable for measurements with different input apertures, for example for photometric measurements of NEDs that correspond to different adaptation states of an observer's eye.

In one embodiment, the liquid lens is arranged on the image side between the front aperture and the objective. This allows a liquid lens to be used whose diameter is small compared to the diameter of the downstream objective lens and which can therefore be manufactured more cost-effectively and/or more accurately.

In one embodiment, the liquid lens and the objective have a diameter of no more than 32.5 millimetres. This embodiment can be produced at low cost and is sufficient for many measurement purposes, for example for the photometric measurement of NEDs, especially if the lens arrangement is swivelled relative to the NED in successive measurements so that a virtual image presented by the NED is captured in overlapping spatial angles.

In one embodiment, the lens is set up for an image-side entocentric beam path or for an image-side telecentric beam path.

An entocentric beam path enables the use of a sensor with a larger sensor area compared to the cross-section of the lens arrangement. This means that relatively large and therefore accurate sensors can be used in conjunction with relatively small and correspondingly inexpensive lenses.

A telecentric beam path enables a variable and therefore particularly robust arrangement of the sensor in relation to the distance to the objective lens arrangement without influencing the image scale.

In one embodiment, the objective has a first objective group which is set up to image the virtual image presented by the objective lens arrangement on the input side into an intermediate image in an intermediate image plane. Furthermore, the lens has at least one structurally separate, preferably independently mounted second objective group, which is arranged downstream of the first objective group in the beam path and is set up to image the intermediate image in the at least one sensor plane.

The structural separation of the objective means that only the first objective group, which is comparatively small compared to the objective as a whole, can be arranged in the immediate vicinity of a measurement object to be imaged, while the at least one downstream second objective group can be arranged at a distance from it. This enables a measurement with high optical quality, for example by imaging the virtual image onto the sensor plane with diffraction-limited accuracy, even within limited construction and movement space.

In a further development of this embodiment, a field lens is arranged in the intermediate image plane, which is set up to adapt a first exit pupil of the first objective group to a second entrance pupil of the second objective group. This means that the diameter of the first objective group can be selected to be the same as the diameter of the second objective group. This enables a particularly space-saving, slim design of the lens arrangement.

Alternatively or additionally, the field lens can be set up to correct an aberration, for example to correct astigmatism or image field curvature. This further improves the optical quality of the image.

In one embodiment, the objective lens arrangement comprises at least one beam deflector, for example a deflecting mirror or a deflecting prism, with which the rays of at least one optical path are deflected at an angle and/or offset relative to a first optical axis running vertically through the front aperture. This saves installation space in the direction of the first optical axis. This embodiment is therefore particularly suitable for the photometric measurement of measurement objects in which the space for the arrangement of a measuring device in the direction of radiation of the measurement object is limited, for example for the photometric measurement of NEDs in which spectacle temples or similar holders protrude into the space around the viewing axis.

In one embodiment, at least one beam splitter is arranged in the beam path of the objective lens arrangement on the image side behind the liquid lens in such a way that it splits the beam path into spatially corresponding images of the virtual image along a first optical path to a first sensor plane and along at least one further optical path to a further sensor plane, respectively. This enables simultaneous, spatially corresponding and spatially resolved measurements, for example with a first luminance camera and with a second luminance camera and/or a colour measurement camera and/or a machine vision camera and/or a light field camera and/or a spectrometer.

According to a second aspect, a measuring device for measuring a NED comprises an objective lens arrangement according to the first aspect of the invention and at least one sensor arranged in a respective sensor plane and set up for photometric and/or colourimetric and/or spectrometric measurement. Preferably, at least one sensor is designed as a spatially resolving planar sensor, but this can also be a point-shaped sensor or a sensor that measures integrating over a sensor surface.

The proposed measuring device is particularly suitable for the limited installation space on the image side of a NED (e.g. due to spectacle temples or similar holders). In addition, due to the externally accessible front aperture, it can be brought particularly easily and precisely into a position that corresponds to the position of the pupil of an observer's eye. This enables a particularly accurate measurement of the NED (corresponding to the perception of the observer's eye). In addition, the measuring device can be adapted to different focusing states of the NED by adjusting the liquid lens, whereby the position of the system entrance pupil (and thus the correspondence of the measurement with the perception by an observer's eye) remains unchanged.

Further advantages of the measuring device correspond to those of the lens arrangement according to the first aspect of the invention.

In one embodiment, the measuring device is designed to swivel along a swivelling axis. The swivelling axis runs perpendicular to a first optical axis, which passes vertically through the front aperture. The swivelling axis intersects this first optical axis at a distance from the front aperture which is approximately equal to the distance of the pivot point of a human eye from its pupil.

By swivelling the measuring device, a different section of the image presented by a NED can be captured. The correspondence to the perception by a human observer's eye is maintained because the centre of rotation of the eye and the centre of rotation of the swivel (i.e. the point of intersection between the swivel axis and the first optical axis) are at the same distance from the respective effective entrance pupil (the front aperture or the eye pupil/iris).

Due to the swivelling capability, it is sufficient if the measuring device only captures a partial area (i.e. only a certain spatial angle) of the virtual image on the at least one sensor in each swivel position. Successive measurements with overlapping partial areas can nevertheless be used to analyze the virtual image presented by the measured NED as a whole. This enables a particularly slim, space-saving design of the measurement arrangement.

In one embodiment, an optical filter is arranged in at least one optical path of the measuring device, i.e. in between the virtual image emitted by the NED and the at least one sensor. The optical filter has a transmission characteristic that is matched to the spectral sensitivity of the overall system comprising the objective and sensor of the measuring device in accordance with a predefined target function. The target function can, for example, be determined by the typical spectral sensitivity of an observer with photopic, scotopic or circadian vision, by an actinic effective spectrum or a similar light effect related to the observer's eye. In embodiments, the optical filter can be set up as a photometric or colourimetric filter. This enables particularly accurate and/or specific photometric/radiometric or colourimetric measurements.

According to a third aspect of the invention, in a method for photometric measurement of a NED using a measuring device according to the second aspect of the invention, at least one optical disturbance which occurs in interaction of the measured NED with the lens arrangement is computationally corrected from at least one raw measurement recorded by the at least one sensor. For example, optical disturbances occurring as stray light, false light and/or multiple reflections can be corrected computationally (that is: by means of an algorithm implemented on a computer).

This makes it possible to dispense with the suppression of such optical interference by external physical apertures, which are usually used when measuring large-area displays, but which are not applicable to NEDs due to their spatial and optical limitations. The computational correction can, for example, increase the contrast range and thus improve the performance of the measuring device.

BRIEF DESCRIPTION OF THE DRAWINGS

In the following, embodiments of the invention are explained in more detail with reference to drawings.

Corresponding parts are given the same reference signs in all figures.

DETAILED DESCRIPTION OF SPECIFIC EMBODIMENTS

Figure 1:
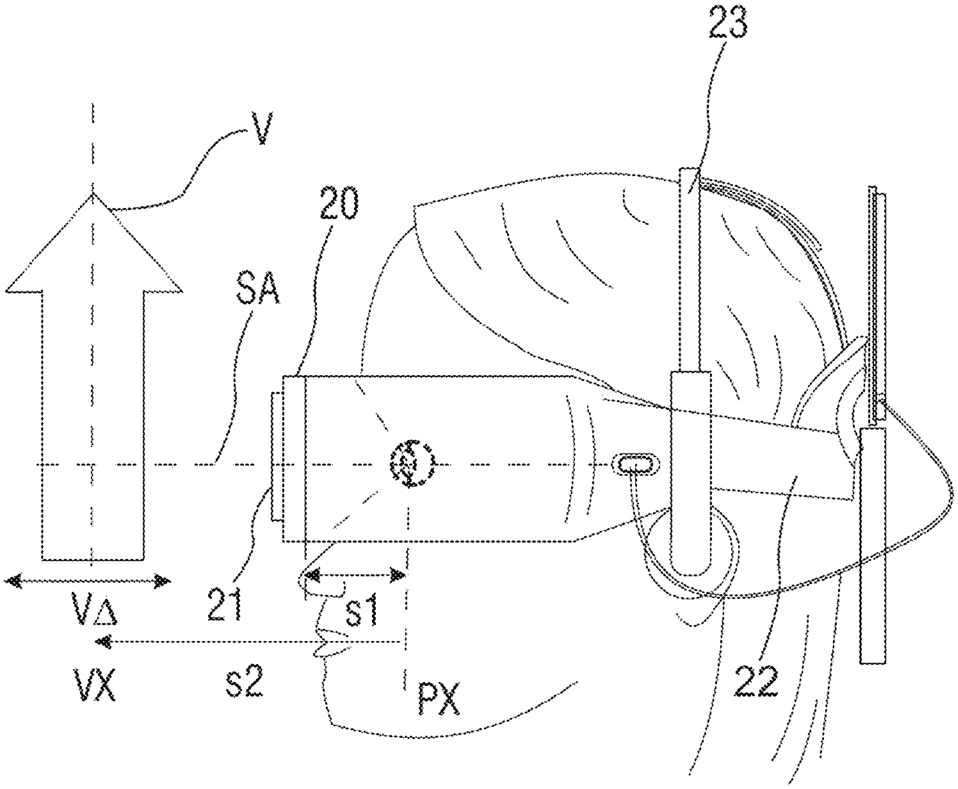
FIG. 1 Prior Art
FIG. 1 is a schematic view and shows a near eye device (NED) known from the state of the art.

FIG. 1 schematically shows a near eye device (NED) 20 known from the prior art in the form of video or VR (virtual reality) glasses. NEDs 20, also known as near eye displays or head mounted displays, are intended for projection into the human eye from a distance that is shorter than the ideal reading distance, typically even shorter than 5 centimetres. NEDs 20 typically have eyeglass temples 22 and/or a headband 23 or a similar support frame to be attached to the head for attachment to the human head.

Along a viewing axis SA, the viewing eye perceives images that are displayed by a schematically depicted internal display element 21 of the NED 20. Such display elements 21 can, for example, be designed as arrays (matrices) of light emitting diodes (LEDs).

The NED 20 is fixed by means of the spectacle frame with eyeglass temples 22 and/or headband 23 in such a way that the pupil of the viewing eye is located at a pupil position PX at a distance s1 from the display element 21 relative to the viewing axis SA. Typically, a NED 20 comprises internal imaging optics, not shown in detail in FIG. 1, for mapping the (real) image displayed on the display element 21 into a virtual, typically enlarged image V at a virtually enlarged image distance s2 (i.e. greater than the actual distance s1 of the display element 21 from the pupil position PX) at the image position VX.

The internal imaging optics of the NED 20 can be designed to be focusable. This means that the position of the virtual image V (i.e. its image position VX at the image distance s2 from the pupil position PX) can be changed within a focus range VΔ. Such a change is compensated for by accommodation of the eye (i.e. by changing the refractive power of the eye lens) in such a way that a sharp image is always imaged on the retina of the eye even in different focusing states of the NED 20, which appears in the respective accommodation state correspondingly at different image distances s2 from the pupil position PX.

The mechanical structure of a NED 20, in particular the very small distance between the display element 21 and the pupil of the eye at the pupil position PX, makes the photometric measurement of NEDs 20 more difficult. In particular, the construction and movement space on the image side facing the viewing eye is limited for the arrangement of a measuring device 100 (not shown in FIG. 1), for example by the headband 23 and/or the eyeglass temples 22.

Such a restriction makes the measurement of focusable NEDs 20 particularly difficult, as the focusing state of the measuring device 100 must be adjusted for different positions of the virtual image V in the focusing range VΔ. Measuring devices known from the prior art use adjustable optical elements to adapt their focusing state along the viewing axis SA. However, the travel range required for this collides with the aforementioned limitations of the construction and movement space.

Therefore, there is a need for a measuring device 100 that can manage with the available limited construction and movement space and still has a high optical quality and measuring accuracy.

Figure 2A:
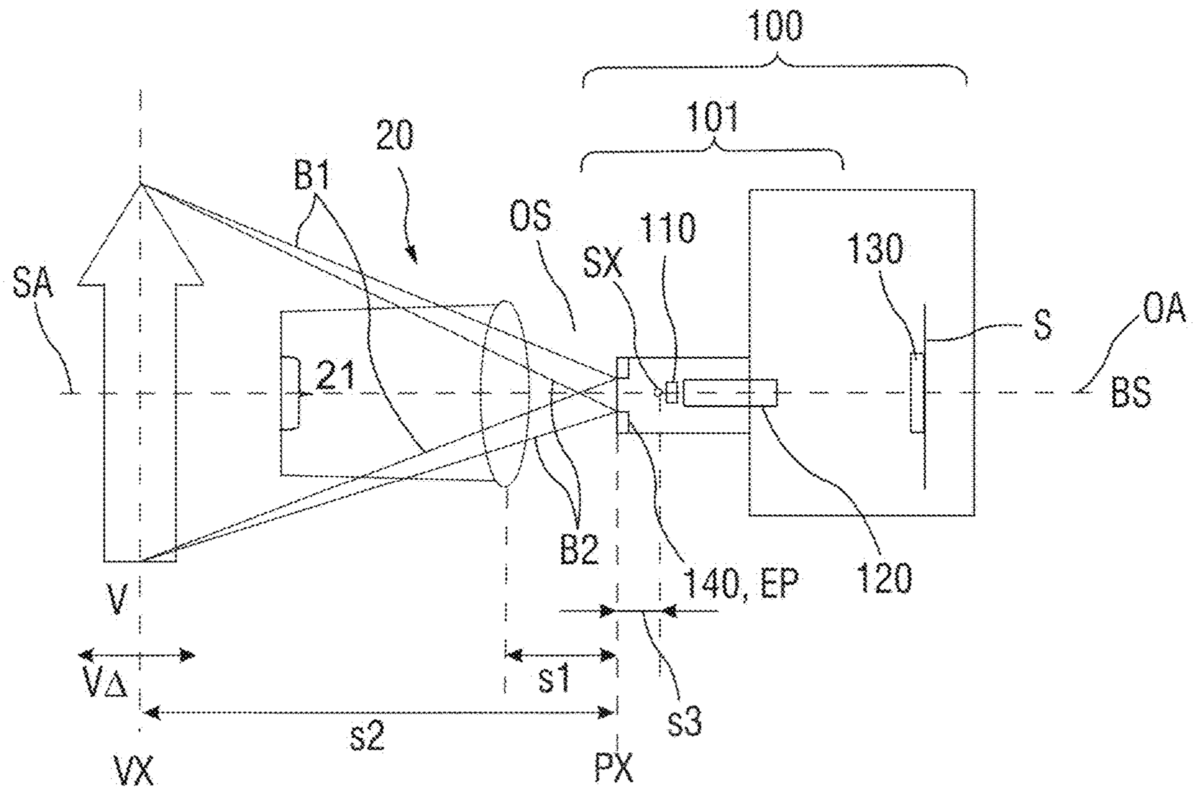
FIGS. 2A, 2B are schematic views of a measuring device for measuring a near eye device in various swivelling positions.
Figure 2B:
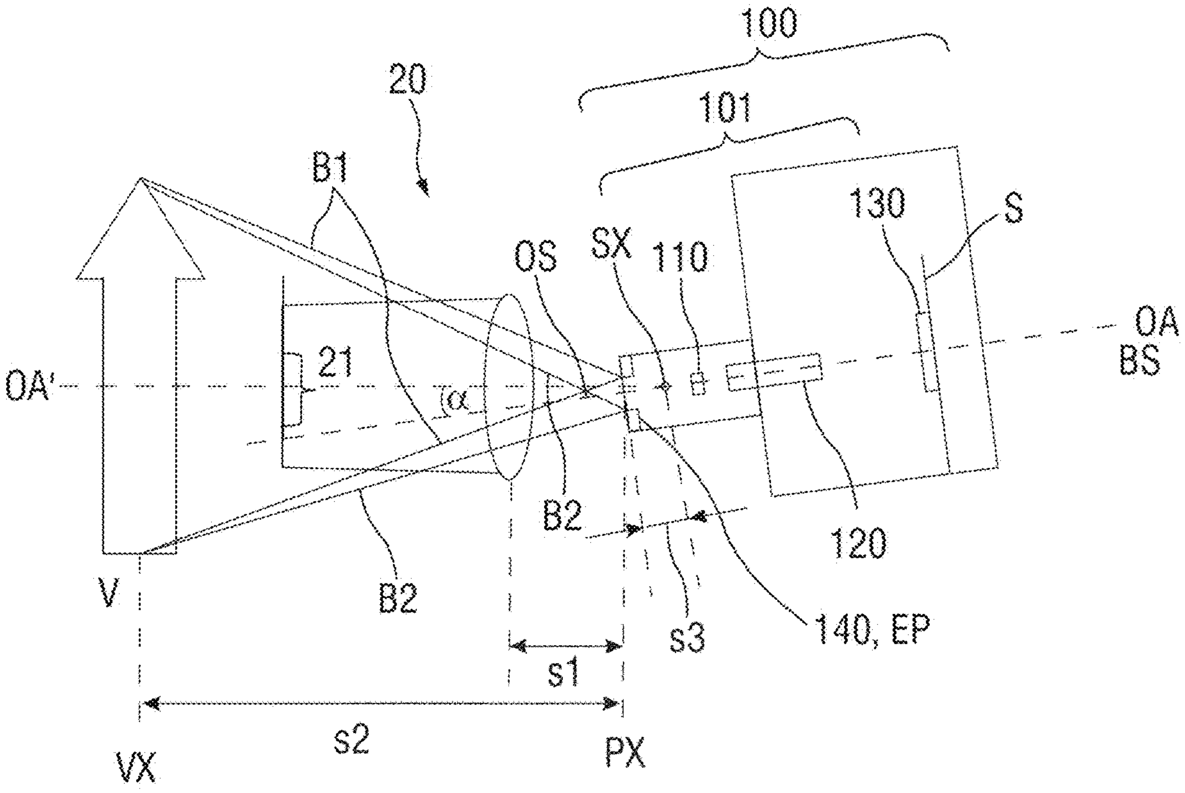

FIG. 2A and FIG. 2B show purely schematically a near eye device (NED) 20 and a measuring device 100 for its optical measurement. The measuring device 100 is arranged for a measurement, for example a photometric or colourimetric measurement, at a position where (according to FIG. 1) the viewing human eye would be located. In FIG. 2A, the optical measurement axis OA (i.e. the optical axis OA of the measuring device 100) coincides with the viewing axis SA of an eye looking at the NED 20 as shown in FIG. 1.

The measuring device 100 comprises a first sensor 130 arranged in a sensor plane S perpendicular to the optical measurement axis OA, and an objective lens arrangement 101, which is set up to image a virtual image V presented by the NED 20 onto the sensor plane S.

For a correct measurement, the system entrance pupil EP of the measuring device 100 must be located at the position of the eye pupil intended for the application of the NED 20, i.e. at the same pupil position PX as the pupil of the viewing eye shown in FIG. 1. For this purpose, the measuring device 100 has a front aperture 140, which is arranged at the pupil position PX along the viewing axis SA.

The beam path emanating from the NED 20 is sketched in simplified form using only ray bundles B1, B2 of the edge rays.

NEDs 20 are known in which images of several internal display elements 21 and/or (in the case of augmented reality (AR) glasses) images of the surroundings are superimposed. For the sake of simplicity, the principle of the proposed measuring device 100 is explained using only one internal display element 21. This principle can, however, be transferred to the measurement of NEDs 20 with several internal display elements 21.

In the case of focusable NEDs 20, the objective lens arrangement 101 must also be adaptable to different focusing states of the NED 20 in a manner corresponding to the eye. The pupil position PX must not be changed when adapting the focusing state.

The design of a NED 20, for example a NED 20 designed as VR glasses with eyeglass temples 22 and/or a headband 23, limits the installation space and the mobility of the measuring device 100. In particular, the objective lens arrangement 101 must be designed to be correspondingly slim in order to avoid collisions with the NED 20.

For the most accurate measurement possible, the objective lens arrangement 101 should be diffraction-limited. If aberrations, such as chromatic aberrations, are unavoidable, they should be designed in such a way that they do not compensate for aberrations in the internal optics of the NED 20 so as not to (positively) falsify the measurement result.

The objective lens arrangement 101 comprises a liquid lens 110 and an objective 120, which are arranged linearly along the optical measurement axis OA of the measuring device 100 behind the front aperture 140, i.e.: lined up in the direction of an image side BS facing away from the NED 20. An object side OS opposite the image side BS along the optical measurement axis OA points towards the NED 20.

Analogous to the generation of an image on the retina, the objective 120 images field rays (schematically illustrated by the ray bundles B1, B2 of the edge rays) from the NED 20 entering the measuring device 100 at different angles onto the two-dimensional sensor 130, which is arranged in the first sensor plane S perpendicular to the optical measurement axis OA.

The sensor 130 is designed for spatially resolved measurement of photometric and/or colourimetric parameters of the NED 20, for example for measuring a luminance or for measuring parameters of a spectral composition of the light emitted by the NED 20.

On the entry or object side (that is: on the object side OS opposite the sensor plane S), the objective lens arrangement 101 has a front aperture 140, which is arranged in front of all optically active elements of the measuring device 100 and has a circular opening concentric to the optical measurement axis OA, which acts as a system entrance pupil EP of the measuring device 100.

With respect to the NED 20, the front aperture 140 is arranged at the pupil position PX, that is: at the position where the pupil of the human eye would typically be located if the NED 20 were fixed to a human head (for example with eyeglass temples 22 and/or a headband 23 or a similar support frame).

The diameter of the system entrance pupil EP is selected from a range of approximately two millimetres and six millimetres, analogous to the pupil diameter of the human eye, and can in particular also be variable.

The optical effect of the liquid lens 110, in particular its refractive power, can be changed by electrical control in a manner explained in more detail below, in particular without mechanically changing its position relative to the objective 120 or relative to the measuring device 100.

By changing the refractive power of the liquid lens 110 (also known as the tunable lens), a change in the focusing state of the NED 20 can be compensated for in the same way as by the accommodation of the eye so that a sharp image of the virtual image V is always generated on the sensor plane S as long as the virtual image V is displayed within the focusing range VA of the NED 20.

In addition, the optical effect of the objective 120 can be corrected by changing the liquid lens 110.

Focusing the image of the virtual image V on the sensor plane S by means of the liquid lens 110 has the advantage that no optical elements need to be moved. Furthermore, the width of the optical arrangement (i.e. the distance between the objective 120 and the display element 21 of the NED 20 and/or to the sensor 130) does not need to be changed.

The liquid lens 110 enables rapid focusing of the image of the virtual image V on the sensor 130. Furthermore, the use of the liquid lens 110 enables a measuring device 100 which is particularly small, since it does not require mechanically moving optical components, in particular without mechanical movement of the objective 120 or individual parts of the objective 120, i.e. no additional travel space is needed for mechanically moving optical components.

As a result, a good image can also be formed for a construction and movement space that is typically particularly limited due to the mechanical and/or optical restrictions of a NED 20 (for example by eyeglass 100 temples 22 or headband 23 as well as by the projection intended for a very short distance to the eye). In addition, the absence of mechanically moving components in the measuring device 100 enables a particularly accurate and reproducible measurement of a NED 20.

An observer can swivel his eye in order to perceive different areas of the image displayed by the NED 20 and thus bring the viewing axis SA into a different orientation compared to the position shown in FIG. 1. In a corresponding manner, so that different points of the object field emitted by the display element 21 of the NED 20 can be measured, the objective lens arrangement 101 and with it also the sensor 130 of the measuring device 100 must also be pivotable relative to the display element 21 about a swivelling axis SX relative to the NED 20. This ensures that the arrangement and position of the system entrance pupil EP relative to the sensor 130 are maintained when the measuring device 100 is swivelled in the same way as the arrangement and position of the eye pupil relative to the retina when an observer's eye is swivelled (rotated).

The swivelling axis SX runs perpendicular to and through the optical measurement axis OA at a distance s3 behind (i.e. on the image side of) the system entrance pupil EP formed by the front aperture 140. This distance s3 is approximately equal to the typical distance of the centre of rotation of a human eye from its pupil, which can be assumed to be approximately 10 millimetres within the scope of individual variations.

In the illustration of FIG. 2A, the optical measurement axis OA approximately corresponds to a viewing axis SA of a viewer's eye aligned perpendicular to the display element 21 of the NED 20 as shown in FIG. 1. FIG. 2B shows a different arrangement of the NED 20 and the measuring device 100 with the difference that the measuring device 100 is swivelled about the swivel axis SX by a swivel angle $\alpha$.

The swivelling axis SX runs approximately through the pivot point of a viewer eye as shown in FIG. 1.

By swivelling the measuring device 100 relative to the NED 20, a change in the viewing direction and/or a change in the position of the NED 20 relative to the eye can be tracked. In other words, this makes it possible to measure an image that would also be imaged in an observer's eye in the same way under a changed viewing angle of the viewing axis SA relative to the NED 20 and/or in a changed position of the NED 20.

In addition, the field of view captured by the sensor 130 can be limited by swivelling the measuring device 100. As a result, the objective 120 can be realized by a compact telescopic arrangement.

The structure and the optical mode of operation of the measuring device 100 are explained in more detail with the aid of further figures.

Figure 3A:
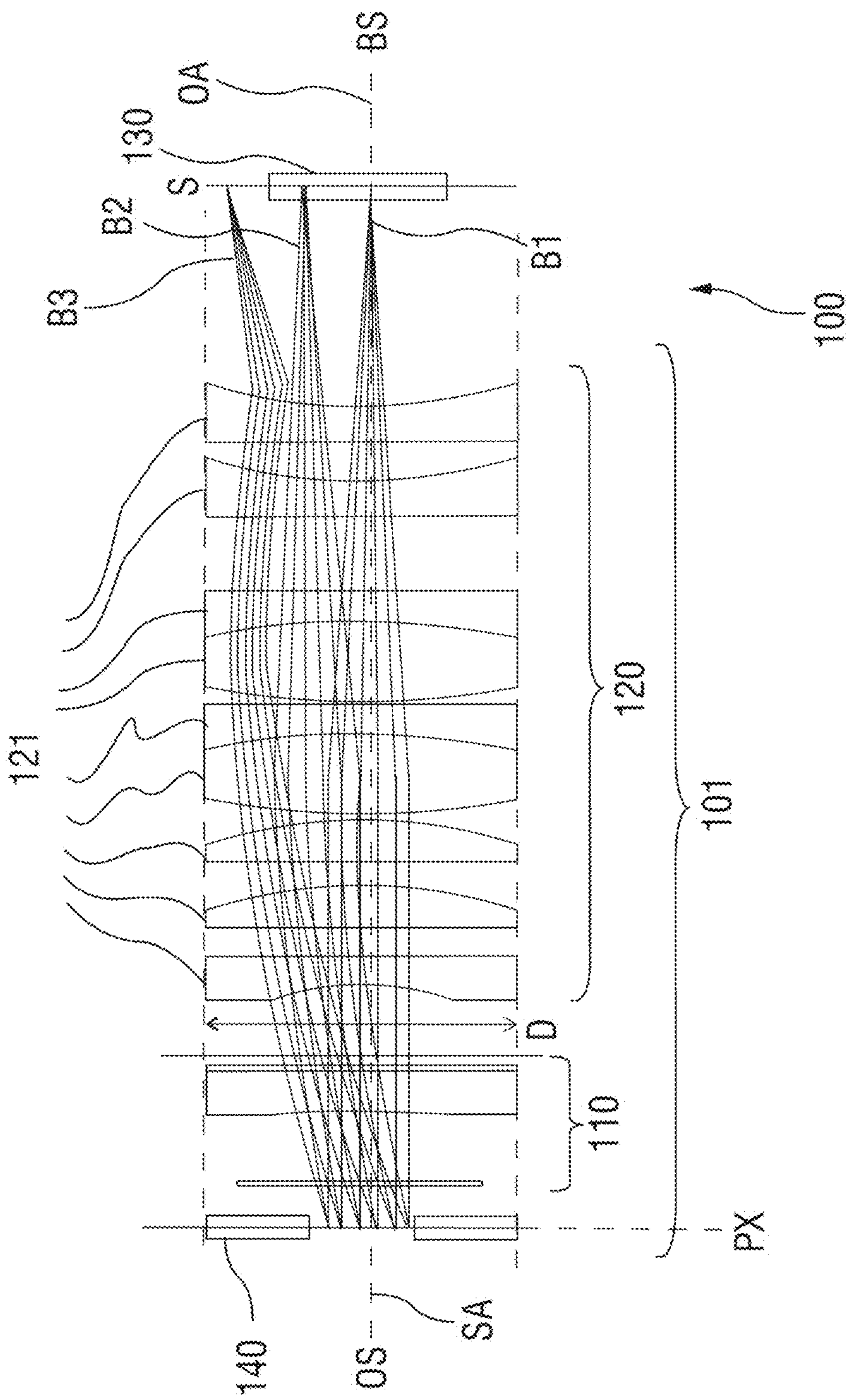
FIGS. 3A, 3B are schematic views of an image-side entocentric and telecentric beam path through a measuring device.
Figure 3B:
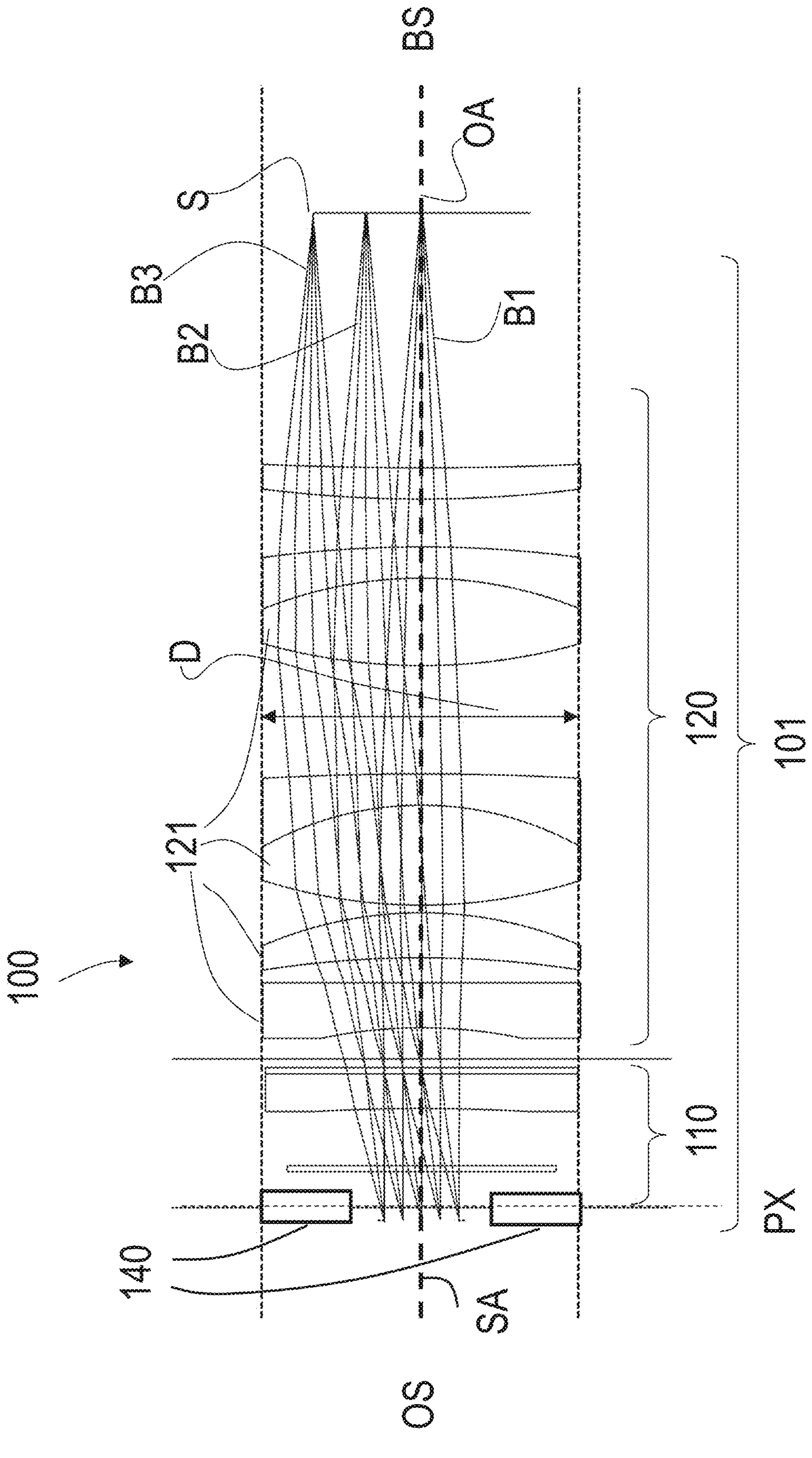

FIGS. 3A and 3B each show a schematic beam path through the measuring device 100 with the objective lens arrangement 101 with the liquid lens 110 and the objective 120 and the front aperture 140 closing off the entry side as well as the sensor 130. To simplify the representation, the swivelling axis SX is not drawn in these and the following figures. The course of field rays which enter the objective lens arrangement 101 through the front aperture 140 at different angles to the optical axis OA is shown merely by way of example by ray bundles B1 to B3.

In the embodiments shown in FIG. 3A and FIG. 3B, the liquid lens 110 is arranged on the object side of the objective 120 between the objective 120 and the front aperture 140. The objective 120 comprises a plurality of lenses 121 arranged linearly along the optical measurement axis OA. The lenses 121 are designed as round optics with an objective diameter D. The optically effective surfaces of the lenses 121 are preferably spherical for simple and cost-effective manufacture, but some or even all of the lenses 121 can also be designed as aspheres in order to achieve a particularly high, in particular diffraction-limited, imaging quality.

For example, the objective 120 may be mounted in a tube, which is not shown in FIGS. 3A, 3B, and which allows a free optical way over a lens diameter D of 30 millimetres. An objective 120 formed in this way (from lenses 121 or lens groups with a lens diameter D of about 30 millimetres) can capture a field of view at a spatial angle of about 30 degrees using liquid lenses 110 known from the prior art and image it onto the sensor 130.

On the one hand, this ensures a sufficiently narrow design to avoid mechanical collisions with the NED 20. On the other hand, a sufficiently large part of the display element 21 can be measured from a single viewing angle (i.e. with unchanged alignment of the measuring device 100 in relation to the NED 20).

To avoid or reduce chromatic aberrations, it is advantageous to combine lenses 121 in assemblies that act as achromats. The objective 120, optionally together with the liquid lens 110, can be mathematically modelled in such a way that artefacts and disturbances occurring within the objective and/or in interaction with the display element 21 and the internal optics of the NED 20, for example stray light, false light or multiple reflections, can be corrected algorithmically. This allows the signal captured by the sensor 130 to be optimized, for example for a photometric and/or a colorimetric measurement, for a resolution measurement, a contrast measurement or a spectrometric measurement.

For example, stray light can be corrected in such a way that the measurable contrast range is algorithmically increased and thus the performance of the objective 120 is improved. Such an algorithmic (computational) improvement of the image mapped on the sensor 130 is particularly advantageous in connection with the present measuring task and the proposed measuring device 100 because, due to the limitation of the installation space/mobility, stray light cannot be corrected using external physical apertures, as is possible and usual, for example, when measuring comparatively large displays from comparatively large measuring distances.

By arranging the front aperture 140 on the object side in front of all optically effective components of the measuring device 100 and thus also in front of all optically effective components of the lens arrangement 101, different front apertures 140 can be interchanged particularly easily, for example those with different aperture diameters. Alternatively or additionally, the front aperture 140 can be designed as an interchangeable aperture or diaphragm, in which different apertures (apertures of different sizes) can be placed in the light path as desired. It is also possible to design the front aperture 140 as an iris diaphragm with a variable, in particular continuously adjustable iris diameter. Such an iris diaphragm can be particularly advantageously motorized.

This makes it possible to take measurements on the NED 20 that correspond to usage situations with differently adapted eyes (for example, for scotopic vision with a wide-open eye pupil with an eye pupil diameter of between five and six millimetres and for photopic vision with a narrow eye pupil with an eye pupil diameter of between one and two millimetres).

In the embodiments according to FIGS. 3A and 3B, the liquid lens 110 is arranged between the front aperture 140 and the objective 120. As a result, a particularly inexpensive and simple liquid lens 110 with a diameter that is smaller than the objective diameter D can be used. However, it is also possible to arrange the liquid lens 110 at a different location along the optical axis OA, for example within the objective 120 when adapting the lens arrangement in the objective 120 accordingly. Such an arrangement is explained in more detail below with reference to FIG. 10.

The liquid lens 110 can be designed as an electrically controllable lens whose refractive power can be changed via an applied electrical voltage (voltage-controlled liquid lens 110) or via an electrical current (current-controlled liquid lens 110). Voltage-controlled liquid lenses 110 are known and available, for example, in an embodiment A-58N provided by the company Corning. Current-controlled liquid lenses 110 are known and available, for example, in an embodiment provided by Optotune as EL-10-30-TC.

Liquid lenses 110 whose refractive power is changed by manual mechanical actuation are also known and can be used.

According to its embodiment, the change in refractive power of the liquid lens 110 can be controlled manually mechanically, manually electronically or by an autofocus algorithm. The refractive power of electronically adjustable liquid lenses 110 can be changed very quickly, typically within a few milliseconds.

In one embodiment, the optical effect of the liquid lens 110 can be modified beyond the change in its focal length in such a way that higher-order aberrations of the objective 120 can be corrected. In a particularly advantageous way, the objective 120 can be designed to be particularly simple and compact. Aberrations of a simple objective 120 can then be compensated for by means of such a liquid lens 110. As a result, the optical performance of the entire objective lens arrangement 101 can be further improved.

In the embodiment shown in FIG. 3A, the lenses 121 are designed and arranged in such a way that an image-side entocentric beam path is produced. This embodiment has the advantage that the image scale can be changed by shifting the sensor plane S along the optical measurement axis OA. In particular, the image size on the sensor 130 can be increased by a shift in the direction of the image side BS. In this way, an optimized image can be generated for different sizes of the sensor 130 (for example for differently sized complementary metal oxide semiconductor (CMOS) or charged coupled device (CCD) pixel matrices).

In particular, an image can also be generated for a sensor 130 with a chip area that extends beyond the lens diameter D of the objective 120. As a result, particularly large and high-resolution sensors 130 can be used for the measuring device 100 with a limited size of the objective 120 for the reasons explained above, with which a particularly accurate measurement is possible with regard to the spatial resolution.

In the embodiment according to FIG. 3B, the lenses 121 are designed and arranged in such a way that a telecentric beam path is generated on the image side. This embodiment has the advantage that the image scale of the projection onto the sensor 130 remains the same regardless of its position along the optical measurement axis OA. Such an embodiment is therefore particularly robust with respect to tolerances and deviations in the arrangement or mounting of the sensor 130 relative to the objective 120.

Figure 4:
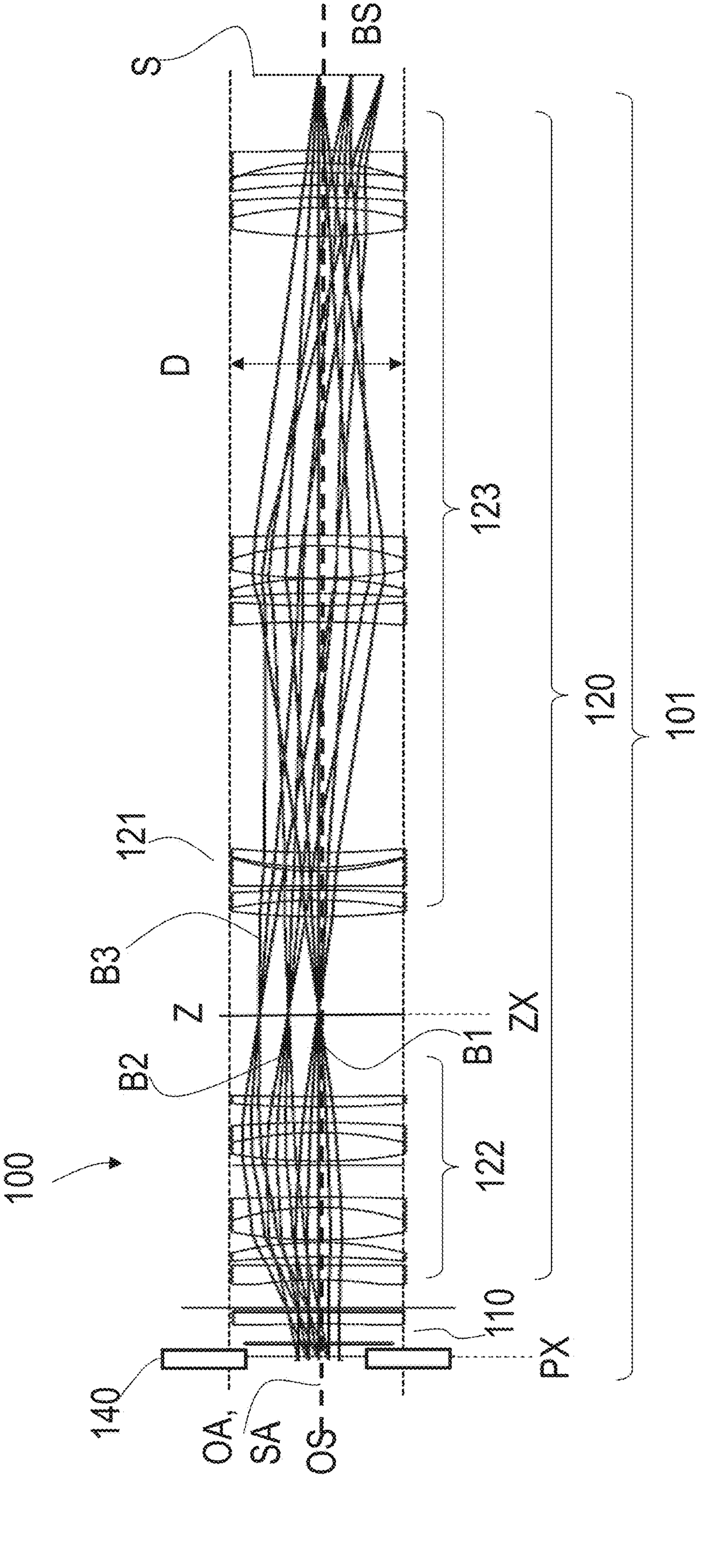
FIG. 4 is a schematic view of an objective lens arrangement with collinear objective groups optically separated by an intermediate image plane.

FIG. 4 schematically shows an embodiment of an objective lens arrangement 101, in which the objective 120 is divided into a first objective group 122 (arranged on the object side) and a second objective group 123 (arranged on the image side), which can be structurally separated (for example, mounted in independent mounts). The first objective group 122 generates an intermediate image in an intermediate image plane Z, which lies perpendicular to the optical measurement axis OA between the objective groups 122, 123 at an intermediate image position ZX. The second objective group 123 maps this intermediate image onto the first sensor plane S.

By separating the objective 120, it is also possible to structurally separate the objective lens arrangement 101 and the measuring device 100 in such a way that only a smaller assembly (compared to a monolithic design of the lens arrangement 101) comprising the first objective group 122, the liquid lens 110 and the front aperture 140 needs to be arranged in the immediate vicinity of the NED 20, while the second objective group 123 can be arranged offset from it. This allows the second objective group 123 to be comparatively larger than in a monolithic embodiment (i.e., a monolithic embodiment mounting the entire objective 120 in a single mechanical unit, such as a tube) without conflicting with the mechanical and/or optical limitations imposed by the design of the NED 20.

By extending the optical path beyond the space enclosed by the NED 20 and its holding devices, an enlarged sensor 130 can also be used. This can improve the spatial resolution and/or the sensitivity of the measurement.

Furthermore, the second objective group 123 may comprise additional lenses 121 for correcting aberrations. For example, the first objective group 122 may be designed to be free of first order refractive errors but not free of higher order refractive errors (for example astigmatism or coma) and thus be simple and small in size. The second, downstream second objective group 123 can be designed to correct the higher-order refractive errors and/or to improve the correction of chromatic aberrations. As a result, the overall quality of the image on the sensor 130 and thus the accuracy of a measurement can be improved, taking into account the limited installation space directly on the NED 20.

The second objective group 123 can be realized as a telescopic arrangement. It can be realized telecentrically or entocentrically on the image side as well as on the object side. Preferably, the second objective group 123 is aligned with the first objective group 122 and with the liquid lens 110 to minimize aberrations.

The embodiment shown in FIG. 4 with two objective groups 122, 123 has the limitation that field rays emerging from the first objective group 122 which intersect in the intermediate image plane Z (i.e.: field rays that image luminous points of the display element 21 of the NED 20 onto the intermediate image plane Z) diverge on the image side behind the intermediate image plane Z and therefore only enter the second objective group 123 as a complete bundle of rays B1 to B3 if the first exit pupil AP1 of the first objective group 122 (not explicitly shown in FIG. 4) is of the same size as the second entrance pupil EP2 of the second objective group 123 (not explicitly shown in FIG. 4).

For efficient utilization of the installation space of the measuring device 100, it is advantageous to match the size of the first exit pupil AP1 and the second entrance pupil EP2 to one another, in particular to make them the same size. For this purpose, the first and second objective groups 122, 123 can be adapted to each other.

Figure 5:
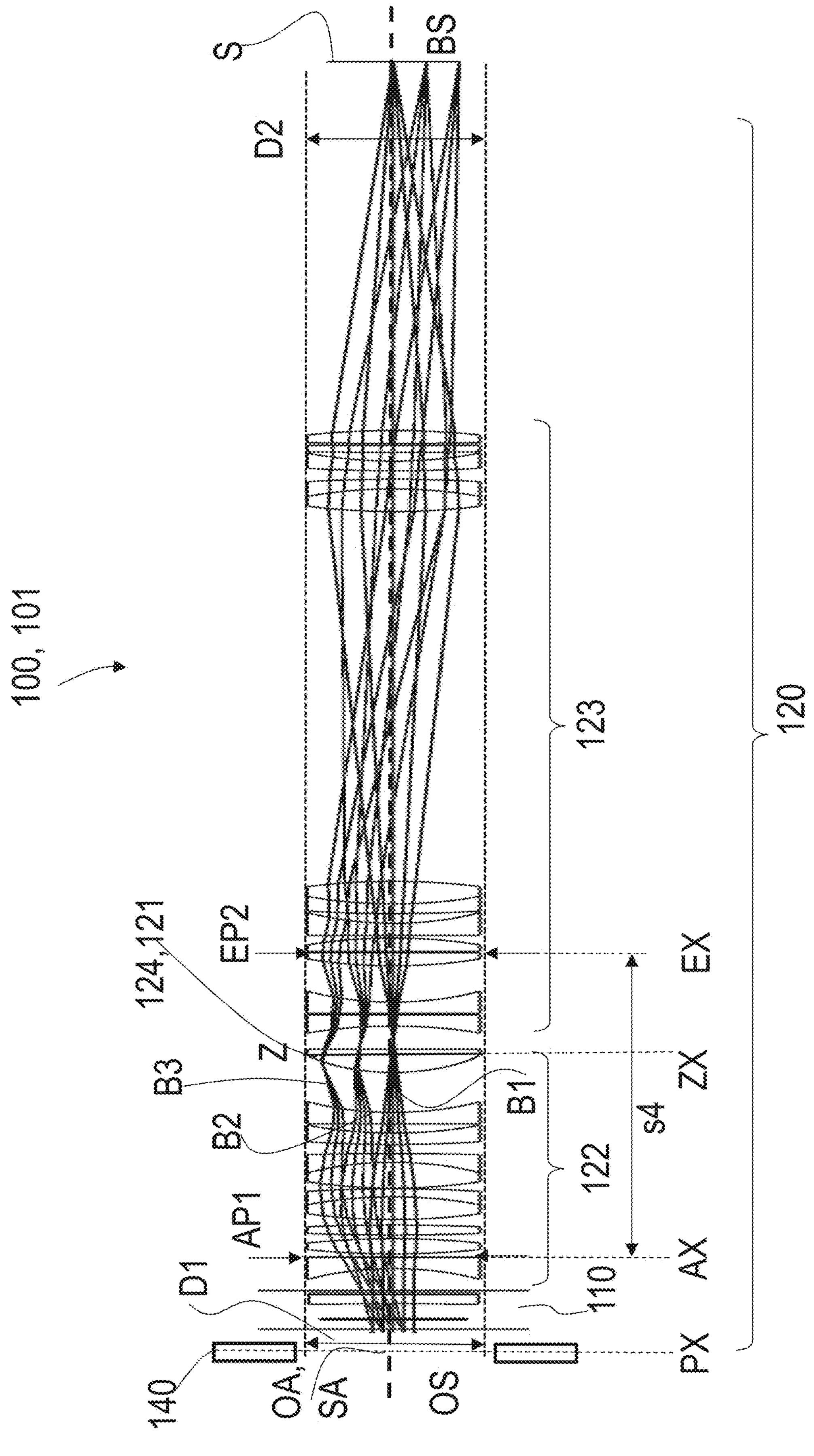
FIG. 5 is a schematic view of an objective lens arrangement with separate objective groups and a field lens arranged in the intermediate image plane.

In contrast, the embodiment shown in FIG. 5 additionally has a field lens 124, which is arranged in or close to the intermediate image plane Z. The field lens 124 maps the first exit pupil AP1 of the first objective group 122 onto the second entrance pupil EP2 of the second objective group 123. In FIG. 5, the first exit pupil AP1 of the first objective group 122 is shown schematically and merely by way of example at the exit pupil position AX and the second entrance pupil EP2 of the second objective group 123 is shown schematically and merely by way of example at the entrance pupil position EX.

With the field lens 124, pupils AP1, EP2 of the objective groups 122, 123 of different sizes, but in particular also of the same size, can be imaged onto one another. As a result, for example, the lens diameters D1, D2 of the first and second objective groups 122, 123 can be chosen to be the same size. As a result, installation space can be saved and an objective 120 with a single, fully utilized lens diameter D1, D2 can be realized, which corresponds to the object field to be imaged.

Additionally or alternatively, the distance (along the optical axis OA) between the objective groups 122, 123 can be varied, shown in FIG. 5 as an example and schematically as the distance between the pupils AP1, EP2. This enables a more flexible design of the objective groups 122, 123. In particular, since the entrance pupil EP2 of the second objective group 123 is not subject to the installation space restriction imposed by the NED 20, it is also possible to design a second objective group 123 with improved optical quality.

The field lens 124 can have further optical effects beyond the imaging of the pupils AP1, EP2 and can, for example, be designed for the correction of an astigmatic aberration, an image field curvature and/or another aberration, preferably a higher order aberration, while the first objective group 122 can be designed in a simplified manner only for the avoidance or minimization of lower order aberrations (for example spherical aberrations). In this way, the installation space required for the first objective group 122 can be kept small and the overall optical quality of the objective lens arrangement 101 can be improved.

The beam path shown in FIG. 5 is entocentric (on the image side). However, a telecentric beam path can also be realized.

Figure 6:
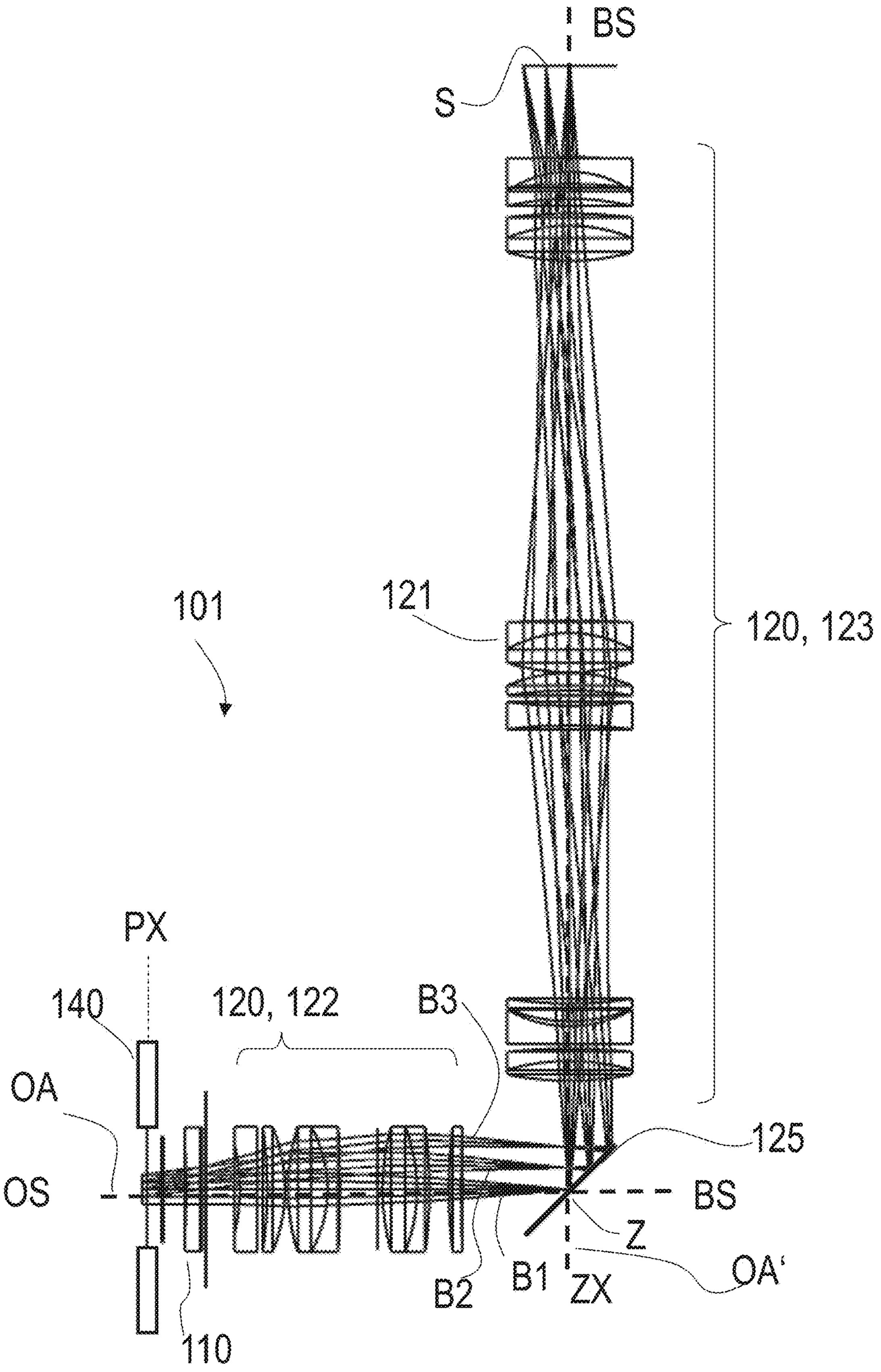
FIG. 6 is a schematic view of an objective lens arrangement with separate objective groups and a deflecting mirror arranged in the intermediate image plane.

FIG. 6 schematically shows a further development of an objective lens arrangement 101 of a measuring device 100 with an objective 120 separated into two objective groups 122, 123, in which a beam deflecting mirror 125 is arranged at the intermediate image position ZX, which is designed as a deflecting mirror 125. Preferably, the deflecting mirror 125 is inclined at an angle of 45 degrees to the optical measurement axis OA of the first objective group 122 and to the optical measurement axis OA' of the second objective group 123, in other words: the optical axes OA, OA' of the first and second objective groups 122, 123 are perpendicular to each other, wherein the optical axis OA of the first objective group 122 essentially corresponds to the viewing axis SA of an eye along which an observer perceives the image projected by the measured NED 20.

An advantage of this further development is that only little installation space is required along the viewing axis SA of a NED 20, since the first objective group 122 can be designed to be small. This makes it also possible to measure NEDs 20 with particularly narrow restrictions along their viewing axis SA, for example if such NEDs 20 are provided with headbands 23 or support frames which project into the viewing axis SA at a small distance from the display element 21.

Instead of the deflecting mirror 125, a deflecting prism (reflection prism) can also be used as beam deflector 125.

The beam path shown in FIG. 6 is entocentric (on the image side). However, a telecentric beam path can also be realized.

Figure 7:
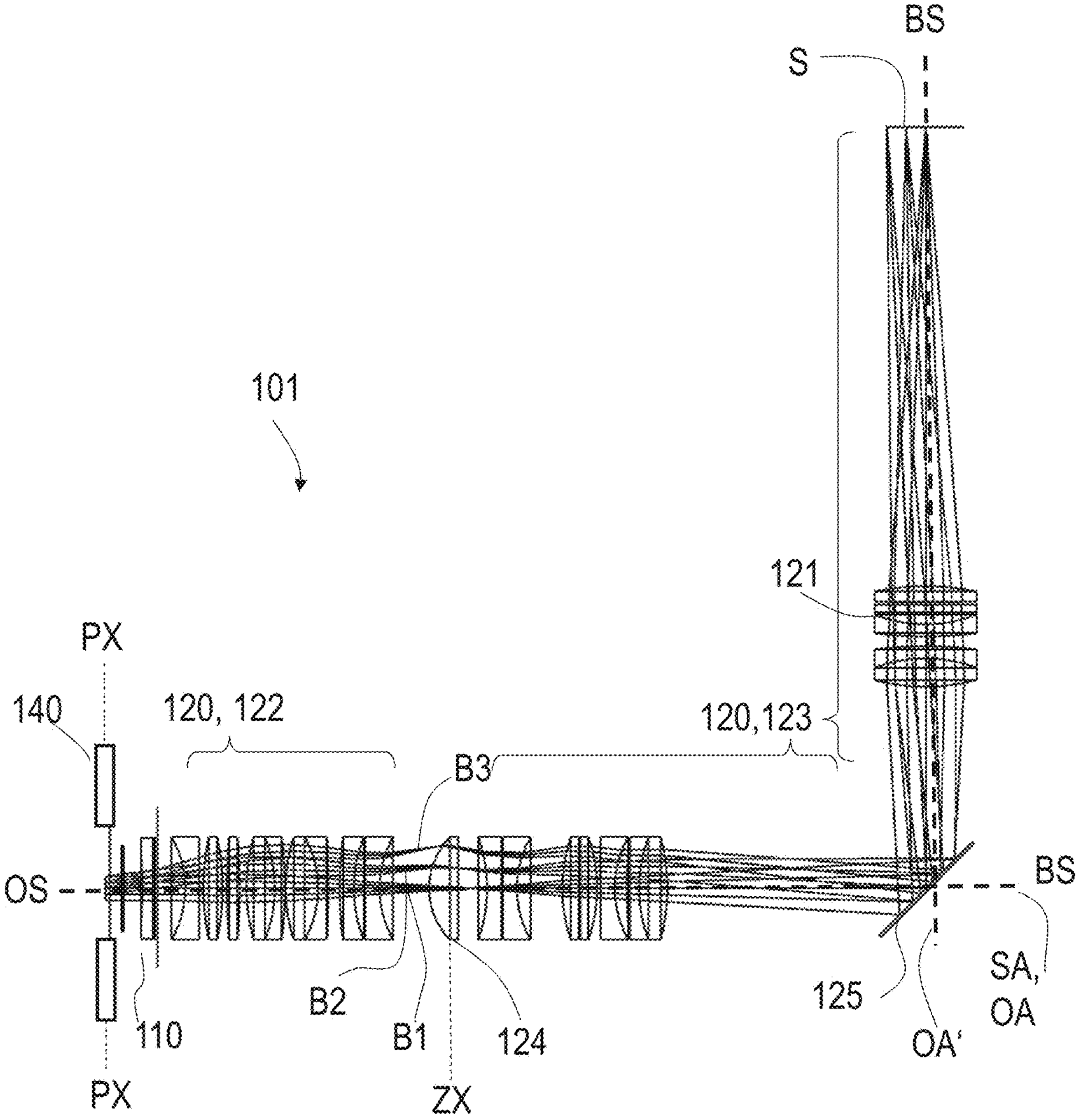
FIG. 7 is a schematic view of an objective lens arrangement with separate objective groups and a field lens arranged in the intermediate image plane and a deflecting mirror arranged in the second objective group.

FIG. 7 shows an alternative embodiment of a beam path deflected by a deflecting mirror 125. Here, the deflecting mirror 125 is arranged inside the second objective group 123 instead of at the intermediate image position ZX (i.e.: on the object side in front of the second objective group 123). The resulting arrangement of a field lens 124 at the intermediate image position ZX enables the advantages of the field lens 124 already explained with reference to FIG. 5 to be achieved in addition to the advantages of a beam path folded (deflected) with a deflecting mirror 125 explained with reference to FIG. 6.

Figure 8:
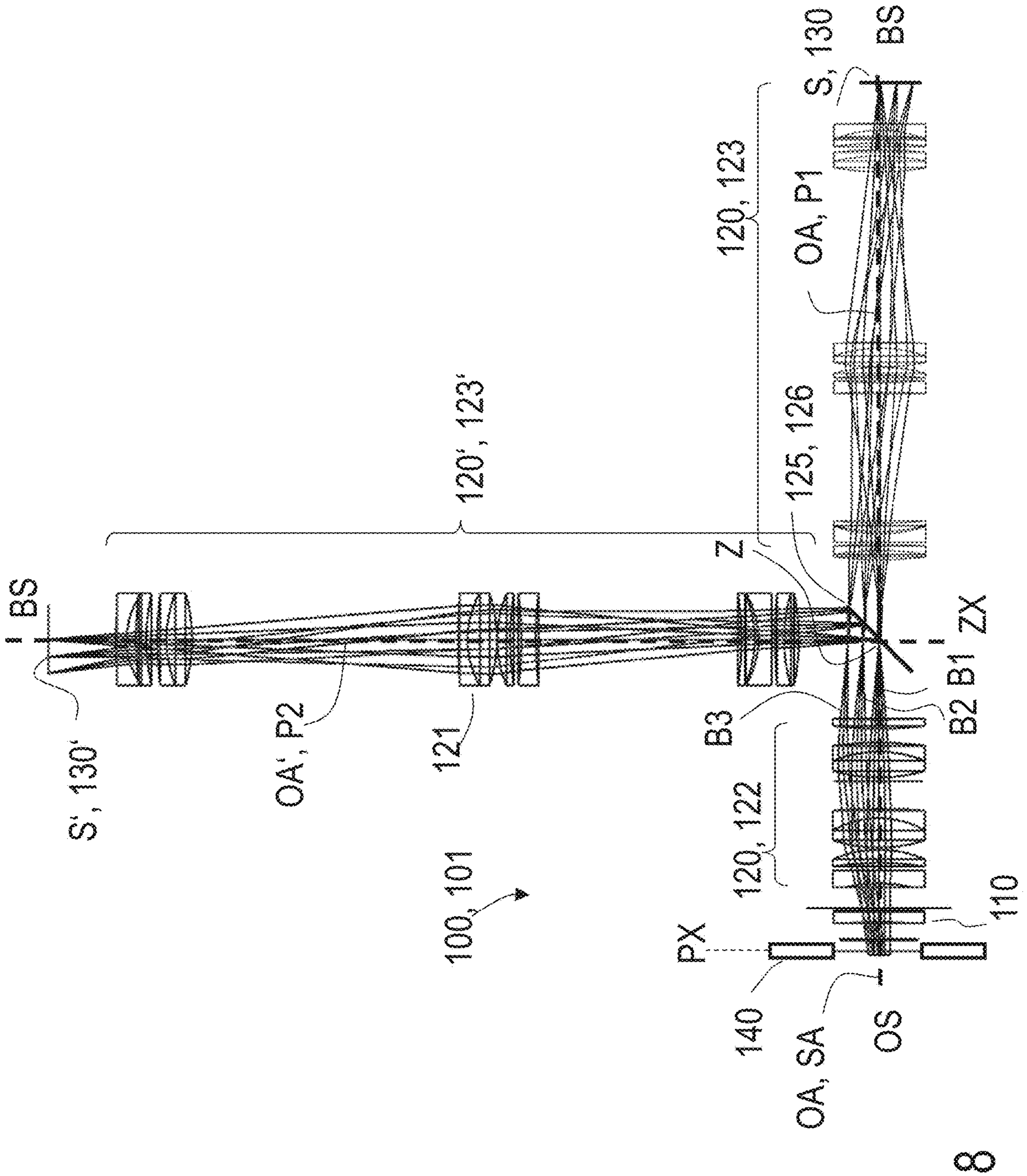
FIG. 8 is a schematic view of a measuring device with a beam path split into two beam paths along two downstream objective groups, each comprising the full aperture, and two sensors.

FIG. 8 schematically illustrates a beam path in an objective lens arrangement 101 of a measuring device 100, which is divided into two mutually perpendicular partial beam paths by means of a beam splitter 126.

A second objective group 123, which images the intermediate image Z onto a first sensor plane S, is arranged along a first optical path P1 on the image side of the beam splitter 126. In addition, a further second objective group 123' is arranged along a second optical path P2 on the image side of the beam splitter 126, which images the intermediate image Z onto a second sensor plane S'. The first optical path P1 runs along the first optical measurement axis OA collinear to the viewing axis SA. The second optical path P2 runs along a second optical measurement axis OA', which is perpendicular to the first optical measurement axis OA/viewing axis SA. In the embodiment shown in FIG. 8, the beam path emerging from the first objective group 122 is split over the entire aperture (i.e. for all ray bundles B1 to B3 emerging from the first objective group 122) into the first and second optical paths P1, P2.

The beam splitter 126 arranged in the intermediate image position ZX can, for example, be designed as a partially transmitting deflecting mirror 125 or as a partially reflecting deflecting prism.

By dividing the optical path, one sensor 130, 130' can be arranged in each of the two sensor planes S, S'. Thus the sensors 130, 130' can measure independently from each other. For example, the first sensor 130 arranged at the image-side end of the first optical path P1 can be designed as a luminance measurement camera. The second sensor 130', arranged at the image-side end of the second optical path P2, can be designed, for example, as a colour measurement camera, light field camera, machine vision camera or spectrometer.

The embodiment shown in FIG. 8 therefore offers the advantage that different measurements can be carried out synchronously on one NED 20.

The arrangement of the beam splitter 126 at the intermediate image position ZX enables a simple geometric correspondence of the images captured by the sensors 130, 130' to each other and to the object (i.e. to the display element 21 of a NED 20). As a result, if one of the sensors 130, 130' is designed as a spectrometer, a locally determined spectral measurement can be carried out in parallel to a luminance measurement carried out by the other sensor 130, 130'.

However, it is also possible to arrange the beam splitter 126 at a different position on the image side of the intermediate image position ZX, for example behind one or more lenses 121 of the second objective group 123, thereby enabling the arrangement of a field lens 124 in the intermediate image position ZX with the advantages that were already described.

Figure 9:
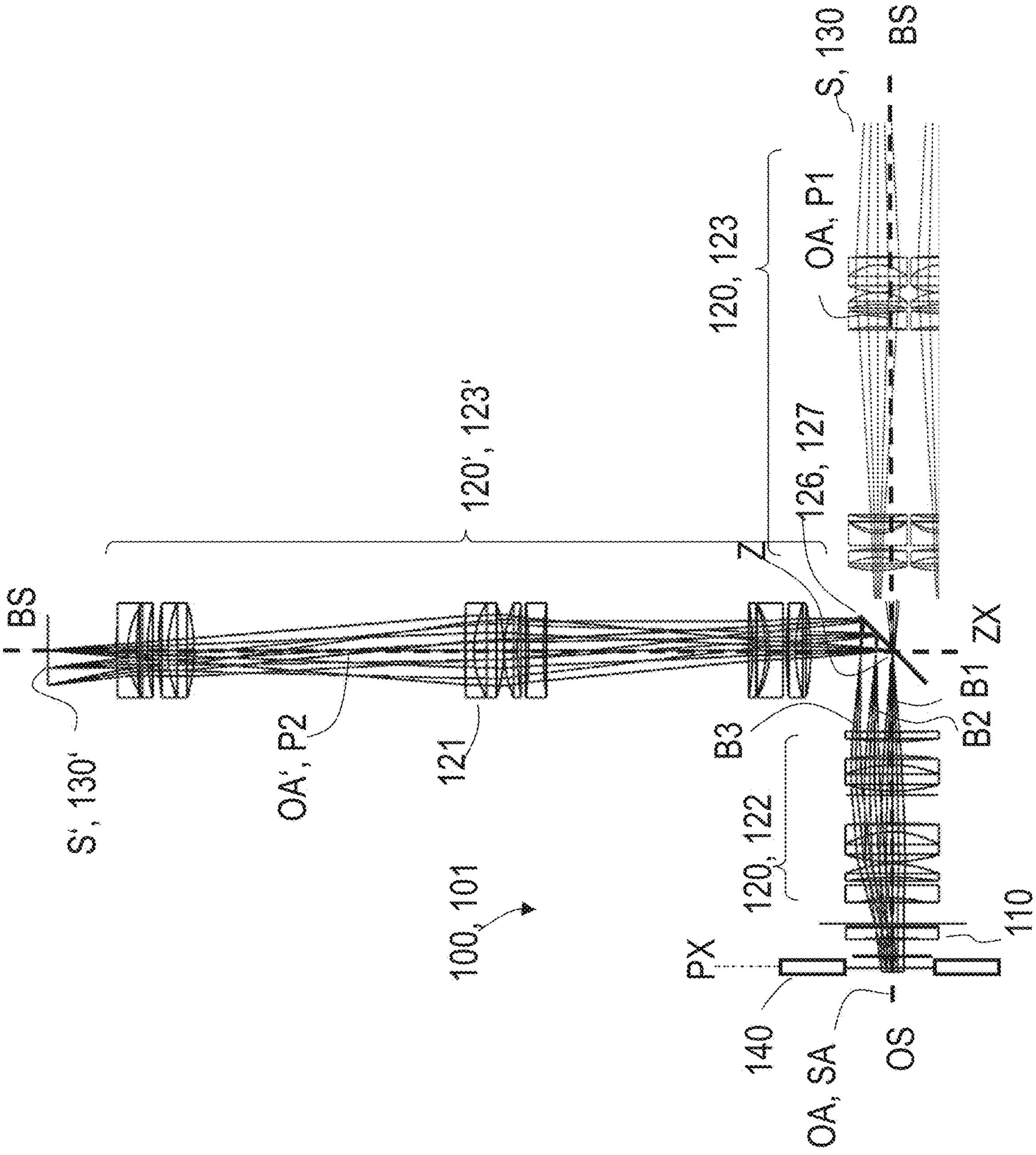
FIG. 9 is a schematic view of a measuring device with a beam path split into two beams along two downstream objective groups, each comprising a partial aperture, and two sensors.

FIG. 9 shows an embodiment of a measuring device 100 with an objective lens arrangement 101 with a split beam path analogous to FIG. 8. In contrast to FIG. 8, the beam splitter 126 here acts only over part of the exit aperture AP of the first objective group 122. In other words, only some, not all, of the ray bundles B1 to B3 are split along the first optical path P1 onto the first sensor 130.

A first to third bundle of rays B1 to B3, which are deflected along the second optical path P2 to the second sensor 130', are shown merely by way of example and schematically in FIG. 9. From these, only the central first bundle of rays B1, which focusses on the point of intersection of the first optical axis OA with the intermediate image plane Z, is also partially guided to the first sensor 130 via the first optical path P1 in addition to the second optical path P2.

Such a beam path flow can be achieved, for example, with a beam splitter 126 designed as a hole mirror 127 or as a partially mirrored deflecting mirror 125 (i.e. a mirror that is fully reflecting over just a part of its area).

Figure 10:
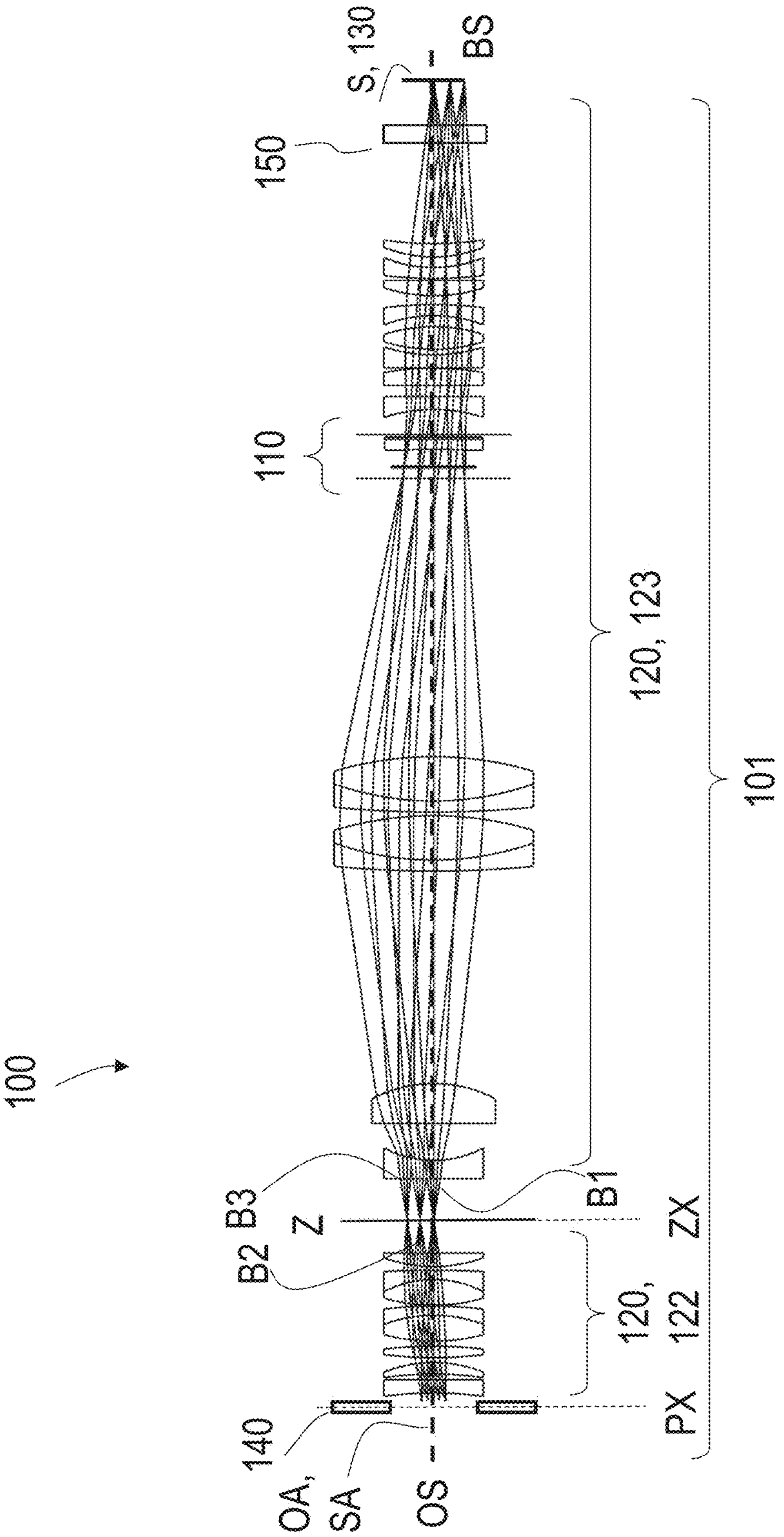
FIG. 10 is a schematic view of a measuring device with a liquid lens arranged in a downstream objective group.

FIG. 10 shows a further embodiment with two objective groups 122, 123, as well as a folded (deflected) but undivided beam path analogous to the embodiments shown in FIGS. 4 and 5. In contrast to these embodiments already explained, in the present case the liquid lens 110 is not arranged between the front aperture 140 and the objective 120, but within the objective 120 in the second objective group 123. An advantage of this arrangement is that the requirements on the installation space for the second objective group 123 are relaxed compared to an arrangement between the first objective group 122 (positioned close to the NED 20) and the front aperture 140.

Furthermore, the embodiment according to FIG. 10 also has an optical filter 150, which is arranged directly in front of the sensor plane S on the object side, but can also be inserted into the beam path at other points. The optical filter 150 can, for example, be designed as a colourimetric filter or as a photometric filter in order to enable colourimetric or photometric measurements with the sensor 130.

In an embodiment with a split beam path (for example according to FIG. 8 or 9), several optical filters 150 of the same or different design can be used analogously, one of which is arranged in each of the optical paths P1, P2.

LIST OF REFERENCE SIGNS

20 Near Eye Device (NED)
21 display element
22 eyeglass temples
23 headband
100 measuring device
101 objective lens arrangement
110 liquid lens, lens
120 objective
121 lens
122 first objective group
123, 123' second objective group
124 field lens, lens
125 deflecting mirror, beam deflector
126 beam splitter
127 hole mirror
130, 130' first, second sensor
140 front aperture
150 filters (photometric, colourimetric)
AP1 first exit pupil, pupil
AX exit pupil position
B1, B2, B3 first to third ray bundle
BS image side
D1, D2, first, second lens diameter, diameter
EP system entrance pupil
EP2 second entrance pupil, pupil
EX entrance pupil position
OA, OA' first, second optical measurement axis, optical axis
OS object side
P1, P2 first, second optical path (beam path)
PX pupil position
S, S' first, second sensor plane
s1, s3 distance
s2 image distance, distance
SA viewing axis, optical axis
SX swivelling axis
V virtual image
VX image position
XΔ focus range
Z intermediate image plane
ZX intermediate image position
α swivelling angle

What is claimed is:

1. An objective lens arrangement comprising:

a front aperture, an objective and a liquid lens, wherein the objective and the liquid lens are fixedly arranged along an optical axis at positions lying on an image side of the front aperture and are designed for imaging a NED imaging beam path, when presented on an opposite object side of the front aperture, onto at least one sensor plane, wherein the liquid lens is adjustable in its optical effect in such a way that those NED imaging beam paths which can be sharply perceived by a human observer can be sharply imaged in the at least one sensor plane by adjusting the liquid lens, wherein the front aperture is designed as an aperture stop for a system entrance pupil of the objective lens arrangement and has an aperture opening of between two millimetres and six millimetres and wherein the objective comprises a first objective group for imaging a virtual image presented on an opposite object side at an image distance in front of the front aperture into an intermediate image in an intermediate image plane and at least one second objective group, structurally separated from the first objective group and arranged downstream along the beam path, for imaging this intermediate image into the at least one sensor plane.

2. The objective lens arrangement according to claim 1, wherein the objective and the liquid lens are designed for imaging the virtual image onto at least one sensor plane, wherein the liquid lens can be adjusted in its optical effect in such a way that virtual images presented in a focus range can be sharply imaged onto the at least one sensor plane by adjusting the liquid lens.

3. The objective lens arrangement according to claim 1, wherein the front aperture is designed as an interchangeable diaphragm with a discretely adjustable diaphragm opening or as an iris diaphragm with a continuously adjustable diaphragm opening.

4. The objective lens arrangement according to claim 1, wherein the liquid lens is arranged on the image side between the front aperture and the objective.

5. The objective lens arrangement according to claim 1, wherein the liquid lens and the objective have a diameter of at most 32.5 millimetres.

6. The objective lens arrangement according to claim 1, wherein the objective is set up for an image-side entocentric beam path or for an image-side telecentric beam path.

7. The objective lens arrangement according to claim 1, wherein a field lens is arranged in the intermediate image plane, which field lens is set up for adapting a first exit pupil of the first objective group to a second entrance pupil of the second objective group and/or for correcting an aberration.

8. The objective lens arrangement according to claim 1, wherein the beam path of at least one optical path is deflected at least in sections with respect to a first optical axis extending perpendicularly through the front aperture in an inclined and/or offset manner by at least one beam deflector.

9. The objective lens arrangement according to claim 1, wherein at least one beam splitter is arranged in the beam path on the image side after the liquid lens in such a way that it splits the beam path into spatially corresponding images that map the virtual image along a first optical path onto a first sensor plane and that map the virtual image along at least one further optical path onto a further sensor plane in each case.

10. A measuring device for measuring a near eye device (NED), comprising:

an objective lens arrangement comprising:

a front aperture, an objective and a liquid lens, wherein the objective and the liquid lens are fixedly arranged along an optical axis at positions lying on an image side of the front aperture and are designed for imaging a NED imaging beam path, when presented on an opposite object side of the front aperture, onto at least one sensor plane, wherein the liquid lens is adjustable in its optical effect in such a way that those NED imaging beam paths which can be sharply perceived by a human observer can be sharply imaged in the at least one sensor plane by adjusting the liquid lens, wherein the front aperture is designed as an aperture stop for a system entrance pupil (EP) of the objective lens arrangement and has an aperture opening of between two millimetres and six millimetres; and further comprising at least one sensor arranged in a respective sensor plane and designed for photometric and/or colourimetric and/or spectrometric measurement of the NED, wherein a photometric or a colorimetric filter is arranged in at least one optical path running from the NED imaging beam path towards the at least one sensor.

11. The measuring device according to claim 10, wherein the measuring device is swivel-mounted along a swivelling axis which intersects a first optical axis extending perpendicularly through the front aperture on the image side at a distance from the front aperture which is approximately equal to the typical distance of the pivot point of a human eye from its pupil.

12. The measuring device according to claim 10, comprising a first objective lens arrangement for imaging a first imaging beam path of a binocular NED onto at least one sensor arranged in a respective sensor plane and set up for a photometric and/or colorimetric and/or spectrometric measurement of the NED and a second objective lens arrangement for imaging a second imaging beam path of the binocular NED onto at least one sensor arranged in a respective sensor plane and set up for photometric and/or colourimetric and/or spectrometric measurement of the NED.

13. A method for photometric measurement of a NED with a measuring device comprising a front aperture, an objective and a liquid lens, wherein the objective and the liquid lens are fixedly arranged along an optical axis at positions lying on one image side relative to the front aperture and are set up for imaging a NED imaging beam path presented on an opposite object side in at least one sensor plane, wherein the liquid lens is adjustable in its optical effect in such a way that NED imaging beam paths which can be sharply perceived by a human observer can be sharply imaged in the at least one sensor plane by adjusting the liquid lens, wherein the front aperture is designed as an aperture diaphragm for a system entrance pupil of the objective lens arrangement and has an aperture opening of between two millimetres and six millimetres, and further comprising at least one sensor arranged in a respective sensor plane and set up for photometric and/or colourimetric and/or spectrometric measurement of the NED, characterized in that at least one optical disturbance occurring in the interaction of the NED with the objective lens arrangement is computationally corrected from at least one raw measurement recorded with the at least one sensor.

* * * * *